(12) United States Patent
Wickersham

(10) Patent No.: US 7,498,790 B2
(45) Date of Patent: Mar. 3, 2009

(54) SWITCHING REGULATOR FREQUENCY CONTROL

(75) Inventor: Robert D. Wickersham, Roy, WA (US)

(73) Assignee: Intel Corporation, Santa Clara, CA (US)

(*) Notice: Subject to any disclaimer, the term of this patent is extended or adjusted under 35 U.S.C. 154(b) by 491 days.

(21) Appl. No.: 10/976,717

(22) Filed: Oct. 29, 2004

(65) Prior Publication Data
US 2006/0091868 A1 May 4, 2006

(51) Int. Cl.
G05F 1/40 (2006.01)
(52) U.S. Cl. .......................... 323/284; 363/97
(58) Field of Classification Search ............. 363/97, 363/40–48, 21.1–21.13, 21.18, 131; 323/271–276, 323/282–286, 280, 290, 222
See application file for complete search history.

(56) References Cited
U.S. PATENT DOCUMENTS

| 4,484,295 | A | * | 11/1984 | Bedard et al. | 708/8 |
| 5,101,336 | A | * | 3/1992 | Willocx et al. | 363/41 |
| 6,329,801 | B1 | * | 12/2001 | Zuniga et al. | 323/285 |
| 6,611,132 | B2 | * | 8/2003 | Nakagawa et al. | 323/284 |
| 6,646,897 | B1 | * | 11/2003 | Lomax et al. | 363/97 |

* cited by examiner

Primary Examiner—Rajnikant B Patel
(74) Attorney, Agent, or Firm—Buckley, Maschoff & Talwalkar LLC

(57) ABSTRACT

A system may include a voltage controller to provide a control signal, a voltage converter to receive the control signal and to change a value of an output voltage in response to the control signal, and an evaluation circuit to determine that a threshold associated with a pulse width of the control signal has been satisfied and to change an electrical value on which a frequency of the control signal is based if the threshold has been satisfied. The voltage controller may increase the frequency of the control signal in response to the changed electrical value. The increase in frequency may be continuous and may begin at start-up.

13 Claims, 6 Drawing Sheets

US 7,498,790 B2

SWITCHING REGULATOR FREQUENCY CONTROL

BACKGROUND

A voltage regulator may receive power from a power supply at first voltage and current values and convert the power to second voltage and current values. According to some examples, the received power is at 12V and 20 A and is converted by the voltage regulator to 1.2V and 100 A. The converted voltage and current values may be suitable for providing power to an integrated circuit (IC) or other electric load.

A voltage regulator may operate by generating a control pulse having a duty cycle that is roughly equal to a ratio of the desired output voltage (e.g. 1.2V) to the power supply voltage (e.g. 12V). The control pulse may be transmitted to a switch that operates in conjunction with other circuitry to generate the output voltage. High frequencies of operation and/or high supply voltage-to-output voltage ratios may require control pulses of extremely short duration. The duration may be particularly short at start-up due to the low output voltages that may be initially required at start-up.

DETAILED DESCRIPTION

Figure 1:
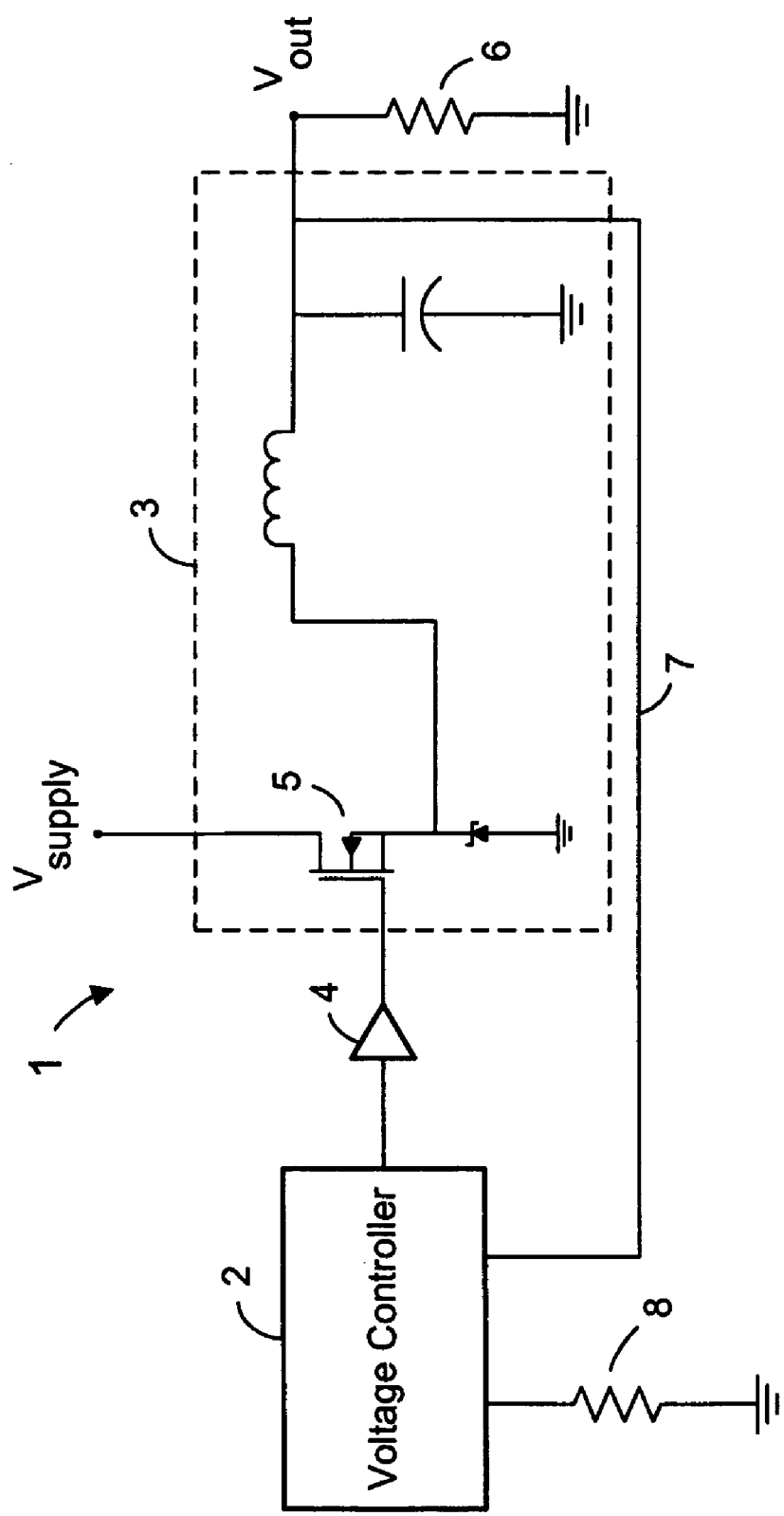
FIG. 1 is a schematic diagram of a conventional voltage regulator.

FIG. 1 is a circuit diagram of a conventional voltage regulator. As is currently known, voltage regulator 1 includes voltage controller 2 and voltage converter 3. Voltage regulator 1 may be used to convert a supply voltage to a lower desired output voltage.

In one example of operation, voltage controller 2 controls driver 4 to transmit a control pulse to voltage converter 3. The control pulse is intended to turn on switch 5 for a duration that causes a desired voltage $V_{out}$ to develop at the illustrated output node. $V_{out}$ is intended to power electric load 6. Voltage regulator 1 includes feedback signal 7 that allows voltage controller 2 to monitor $V_{out}$ and adjust the control pulse accordingly. Voltage regulator 1 also includes resistor 8 coupled to voltage controller 2. Resistor 8 determines a frequency at which controller 2 operates. The frequency may be changed by changing a value of resistor 8.

As mentioned above, the elements of voltage regulator 1 may be unable to operate efficiently in conjunction with pulses of certain duration that may be required in some circumstances. Driver 4 may be unable to generate a control pulse of the required duration. Even if driver 4 could generate the required control pulse, switch 5 may not be able to respond correctly to the control pulse. Switch 5 may therefore operate linearly, generating undesirable amounts of heat and eventually causing regulator 1 to shut down.

Figure 2:
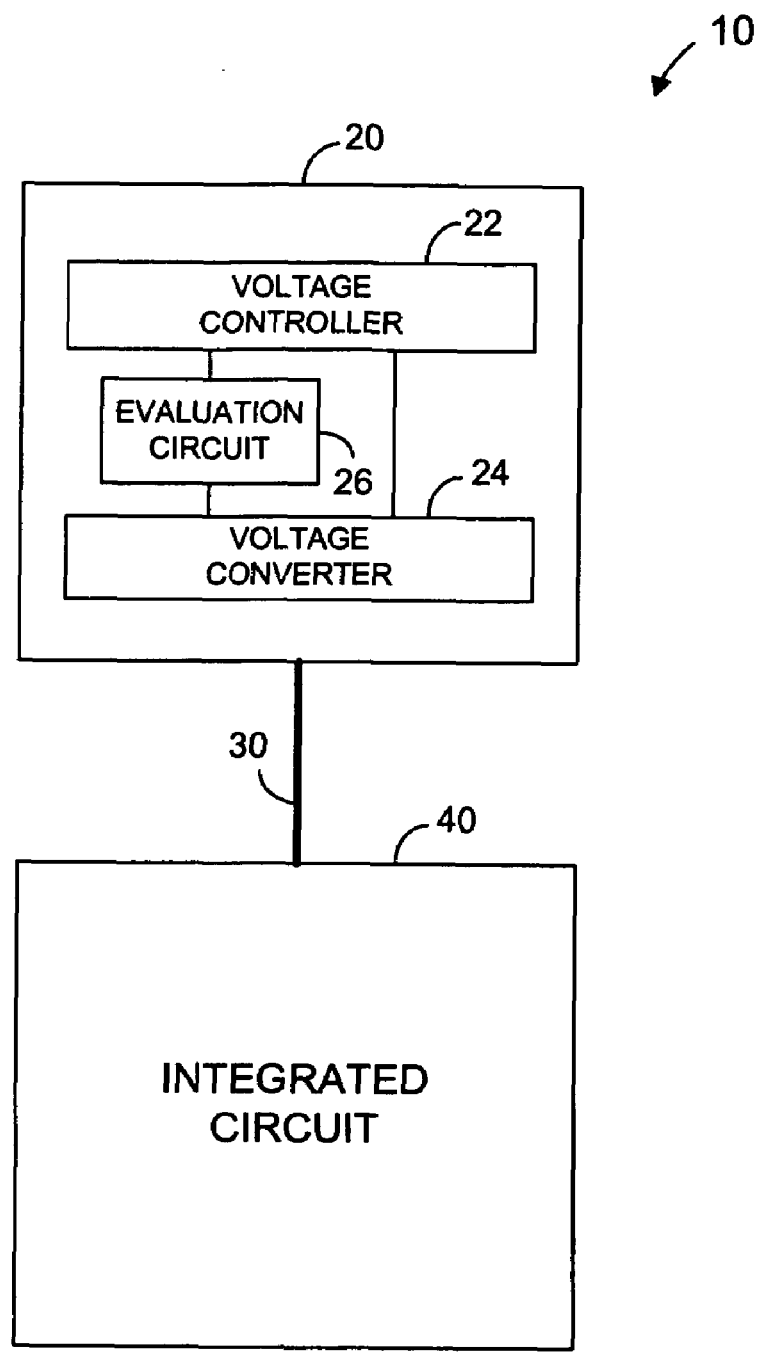
FIG. 2 is a block diagram of a system according to some embodiments.

FIG. 2 is a block diagram of system 10 according to some embodiments. System 10 comprises voltage regulator 20, which in turn comprises voltage controller 22, voltage converter 24 and evaluation circuit 26. Voltage regulator 20 outputs power at a desired output voltage value to power bus 30, which in turn provides the power to IC 40. IC 40 may comprise a microprocessor or any suitable electric load. System 10 may be used in a computer motherboard or in any other platform according to some embodiments. For example, voltage regulator 20 may be implemented as a voltage regulator "module" that is mounted to a substrate that in turn may be coupled to a motherboard, or as a voltage regulator "down" having elements that are mounted directly on a motherboard, or in any other fashion.

Generally, voltage controller 22 and voltage converter 24 may comprise any currently- or hereafter-known systems to provide regulated power to IC 40. According to some embodiments, voltage controller 22 provides a control signal to voltage converter 24, and voltage converter 24 receives the control signal and increases a value of the output voltage in response to the control signal. Evaluation circuit 26 may then determine that a threshold associated with the output voltage has been satisfied and, if the threshold has been satisfied, may change an electrical value on which the frequency of the control signal is based. Voltage controller 22 then increases the frequency of the control signal in response to the changed electrical value. Such operation may be used to ensure that pulses of the control signal are of sufficient duration to allow proper operation of voltage regulator 1.

Figure 3:
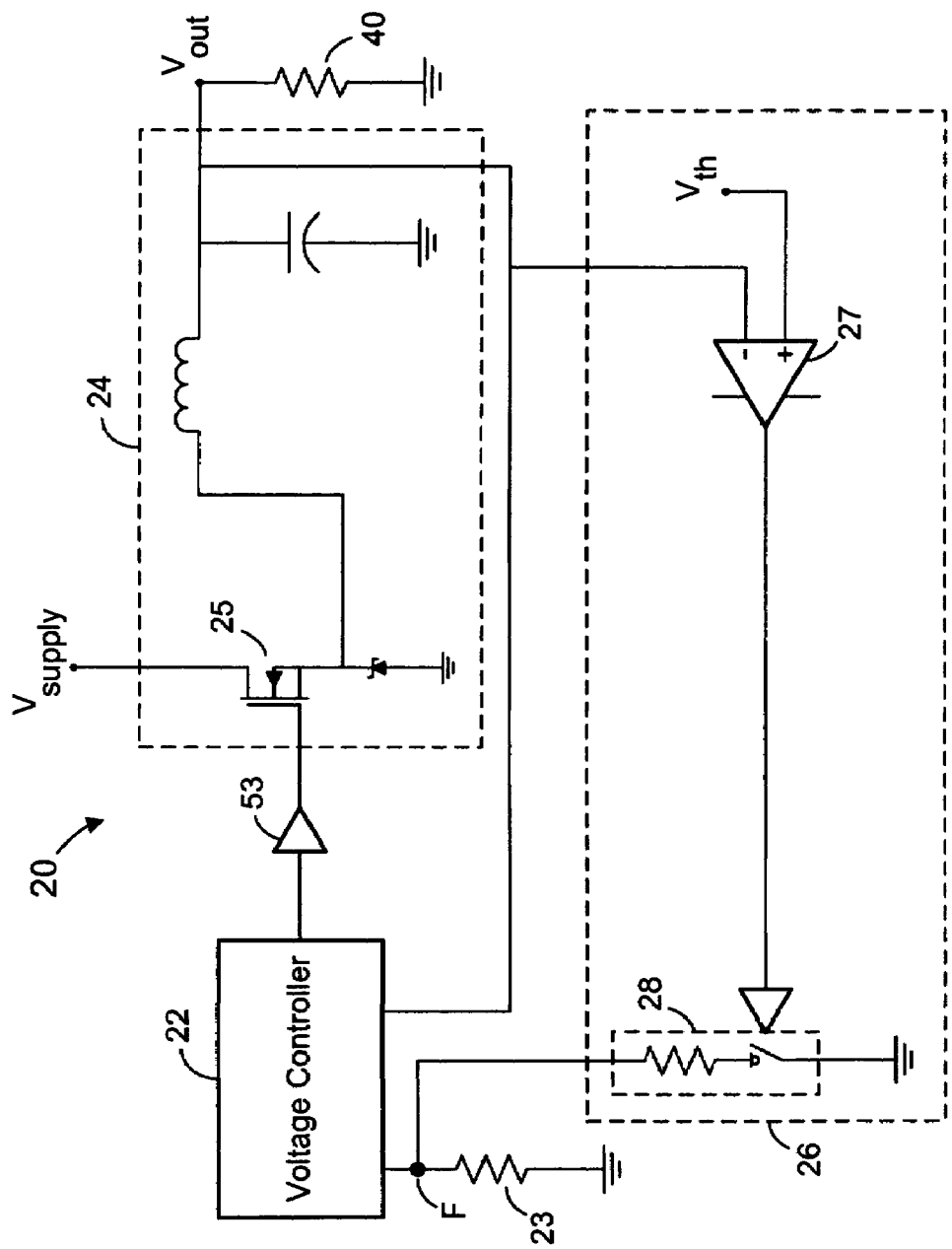
FIG. 3 is a schematic diagram of a voltage regulator according to some embodiments.

FIG. 3 is a circuit diagram of voltage regulator 20 according to some embodiments. FIG. 3 shows voltage controller 22, voltage converter 24, and evaluation circuit 26.

Voltage controller 22 may comprise any suitable currently- or hereafter-known device to transmit a control signal for controlling a voltage converter. In some embodiments, a frequency of the control signal is determined by a resistance value coupled to node F. In the illustrated example, resistor 23 is coupled to node F and therefore determines the frequency of the control signal. Voltage controller 22 is coupled to $V_{out}$ in order to monitor the value of $V_{out}$ and to adjust the control signal accordingly. According to some embodiments, voltage controller 22 comprises a voltage regulator controller IC that provides functionality in addition to that described herein.

Driver 23 receives the control signal from controller 22 and transmits a pulse to converter 24 based on the control signal. The pulse may be identical to the control signal. According to some embodiments, driver 53 is an element of controller 22.

Converter 24 comprises a non-synchronous Buck regulator including n-channel metal-oxide semiconductor field effect transistor (MOSFET) 25. A gate terminal of MOSFET 25 receives a pulse from driver 53. The pulse therefore causes MOSFET 25 to pass current when the pulse reaches a suitable positive voltage. As described above, the duration of the pulse is controlled such that a desired voltage $V_{out}$ develops at the illustrated output node. Embodiments may comprise any other type of switching converter, including a synchronous converter. Moreover, any number of converter phases may be used in conjunction with some embodiments.

Evaluation circuit 26 comprises comparator 27, which is coupled to the output voltage $V_{out}$ and to a predetermined voltage $V_{th}$. Comparator 27 compares the value of $V_{out}$ with the value of $V_{th}$ and drives frequency-changing element 28 if the value of $V_{out}$ is greater than the value of $V_{th}$. Frequency-changing element 28 of the FIG. 3 embodiment comprises a resistor and a switch coupled in series. Element 28 is coupled in parallel to resistor 23. By virtue of the foregoing arrangement, voltage controller 22 "sees" resistance $R_{23}$ if the switch of element 28 is open, and sees resistance $(R_{23} R_{28})/(R_{23}+R_{28})$ if the switch of element 28 is closed.

Therefore, upon detecting that the value of $V_{out}$ is greater than the value of $V_{th}$, comparator 27 closes the switch of element 28, thereby reducing the resistance value coupled to node F. According to some embodiments, the reduced resistance value causes voltage controller 22 to increase the frequency of the control signal emitted by controller 22 (and/or driver 53).

Figure 4:
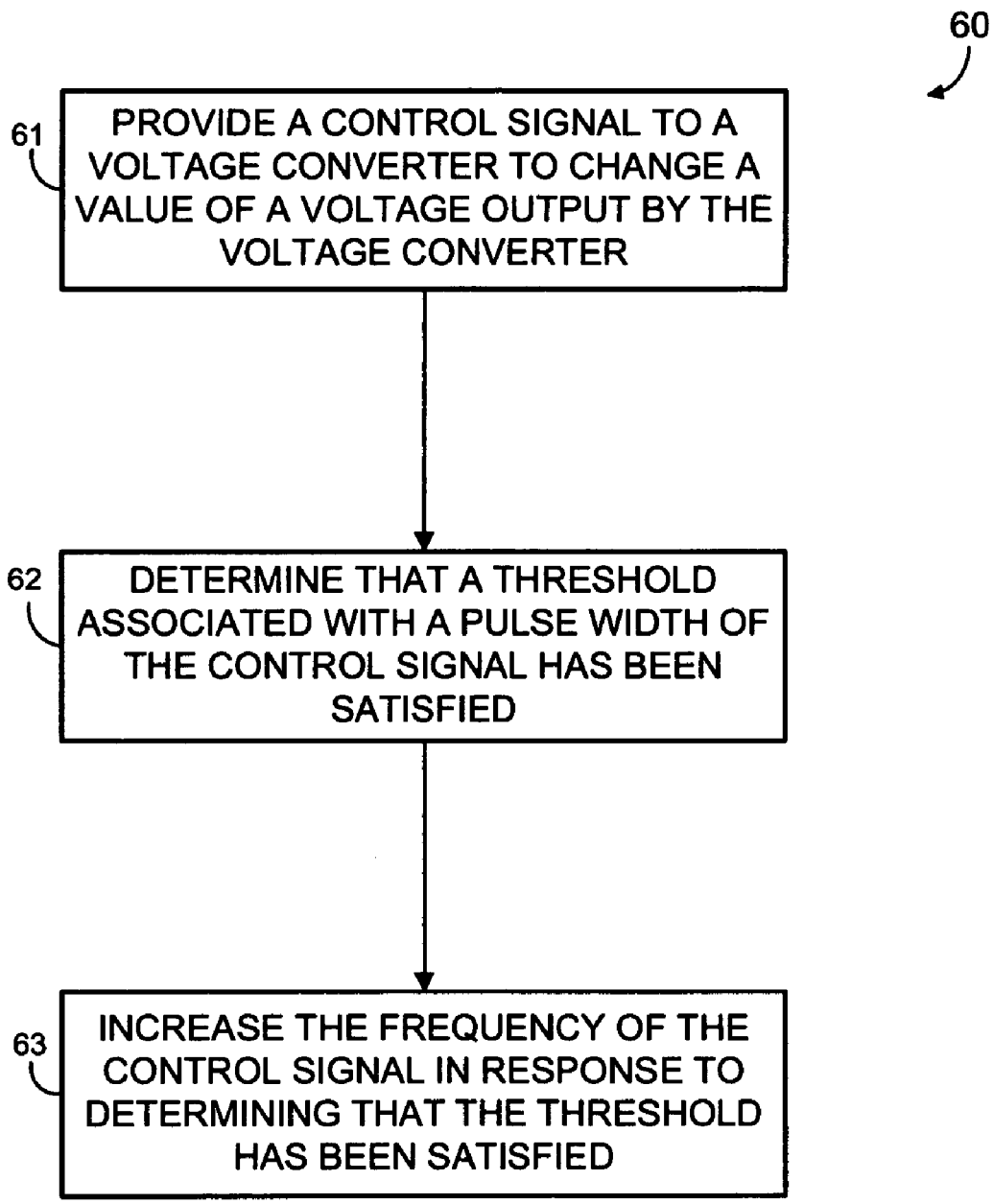
FIG. 4 is a diagram of a process according to some embodiments.

FIG. 4 is a flow diagram of process 60. Process 60 illustrates procedures executed by voltage regulator 20 according to some embodiments. Process 60 will be described with respect to the embodiment of FIG. 3, however, process 60 may be executed by any suitable combination of discrete components, integrated circuits, and/or software.

Initially, at 61, a control signal is provided to a voltage converter to change a value of a voltage output by the voltage converter. The control signal may be provided by voltage controller 22, and may be provided whenever a change in output voltage is desired. According to the present example, voltage regulator 20 begins process 60 in start-up mode. Voltage regulator 20 therefore operates at 61 to ramp up output voltage $V_{out}$ from a low voltage to a desired supply voltage in order to avoid generating large currents from charging the output capacitor of voltage converter 24, as would occur if $V_{out}$ increased too rapidly.

The control signal may comprise a series of pulses. Each pulse is intended to turn on MOSFET 25 for the duration of the pulse. A duty cycle of the pulse may be approximately equal to $V_{out}/V_{supply}$.

Figure 5A:
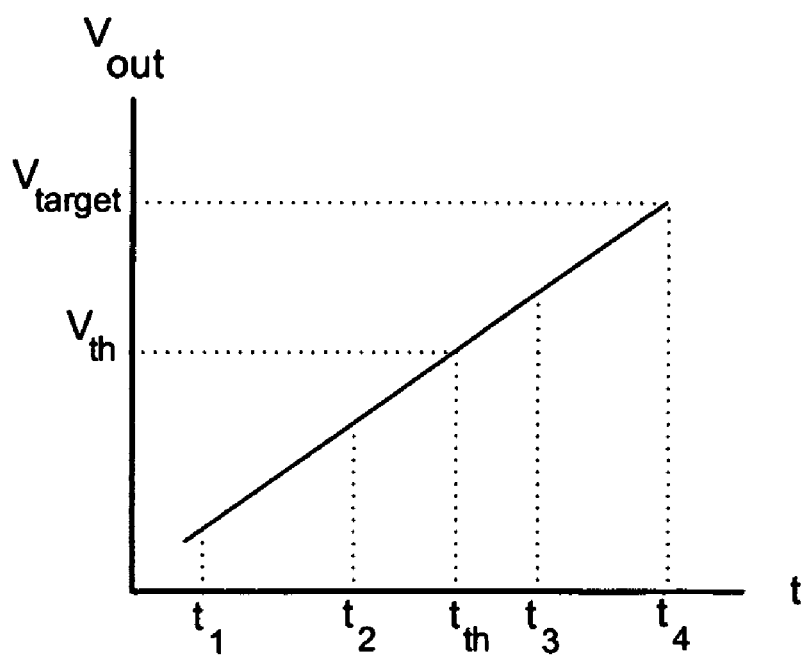
FIG. 5A is a graph of output voltage vs. time according to some embodiments.
Figure 5B:
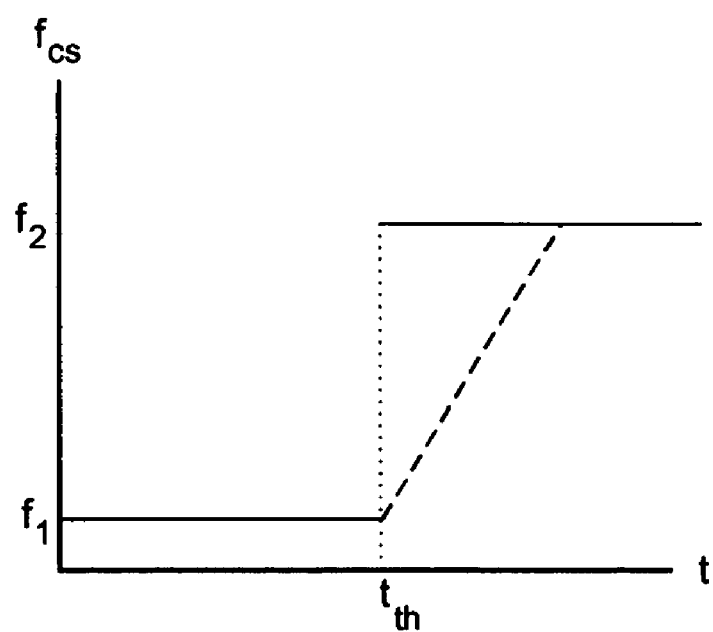
FIG. 5B is a graph of a control signal frequency vs. time according to some embodiments.

FIG. 5A is a graph illustrating $V_{out}$ vs. time (t) and FIG. 5B is a graph of a frequency of the control signal vs. t according to some embodiments of process 60. From time t=0 to time $t_{th}$, process 60 remains at 61 while a control signal is provided to converter 24 to increase the value of $V_{out}$. The frequency of the control signal remains at $f_1$ from time t=0 to time $t_{th}$.

The table below shows characteristics of the control signal for various values of $V_{out}$ according to some embodiments.

| t | $V_{out}$ | $f_{cs}$ | $T_{cs}$ | $D_{cs}$ | $W_{cs}$ |
|---|---|---|---|---|---|
| $t_1$ | .072 V | 100 kHz | 10 μs | .6% | .06 μs |
| $t_2$ | .36 V | 100 kHz | 10 μs | 3% | .3 μs |
| $t_3$ | .72 V | 1 MHz | 1 μs | 6% | .06 μs |
| $t_4$ | 1.2 V | 1 MHz | 1 μs | 10% | .1 μs |

The table indicates that the frequency of the control signal ($f_{cs}$) is 100 kHz at time $t_1$ and time $t_2$. Consequently, the period of the control signal ($T_{cs}$) is 10 μs at time $t_1$ and time $t_2$. The desired output voltages at time $t_1$ and time $t_2$ are 0.072V and 0.36V, respectively. It will be assumed that the voltage supplied to voltage regulator 20 ($V_{supply}$) is 12V. Accordingly, the duty cycle of the control signal is 0.072/12=0.6% at time $t_1$ and 0.36/12=3% at time $t_2$. In view of these duty cycles and the period of the control signal, the duration (or "width") of the above-mentioned control signal pulse is 0.06 μs at time $t_1$ and increases to 0.3 μs at time $t_2$.

Returning to process 60, the value of $V_{out}$ increases at 61 until it is determined at 62 that a threshold associated with a pulse width of the control signal has been satisfied. The threshold may be any value by which regulator 20 may determine that the frequency of the control signal may be increased without causing the pulse width of the control signal to become unacceptably short.

In the FIG. 3 embodiment, the threshold is a particular value of the output voltage. The threshold is determined to be satisfied at 62 when circuit 26 determines that $V_{out}$ is greater than the value $V_{th}$. The threshold may be a particular amount of time from startup of voltage regulator 20. Therefore, circuit 26 may determine that the threshold is satisfied once the particular amount of time has elapsed from startup of regulator 20. According to some embodiments, the threshold is a particular pulse width of the control signal, and the actual pulse width is measured and compared to the particular pulse width at 62.

The determination at 62 occurs at time $t_{th}$ according to the present example. As a result, the frequency of the control signal is thereafter increased in response to the determination at 63. This increase from $f_1$ to $f_2$ is shown in FIG. 5B. As also shown, this increase may occur stepwise (solid line) or gradually (dashed line). The increase may begin at start-up according to some embodiments.

The frequency may be increased by changing an electrical value on which the frequency is based. According to various embodiments, the electrical value may be an RC value, an LC value, an RL value, a voltage value, a current value, a parameter stored in software, any other electrical value, or any combination thereof. In the FIG. 3 embodiment, the determination at 62 causes frequency-changing element 28 to couple a resistor in parallel with resistor 23. The resulting decrease in resistance at node F causes voltage controller 22 to increase the frequency of the control signal. According to other embodiments, the frequency is increased by increasing an electrical value on which the frequency is based. Any other frequency-changing element may be used in conjunction with some embodiments.

Referring back to the above table, the frequency $f_{cs}$ of the control signal is increased to 1 MHz at time $t_{th}$. The period $T_{cs}$ of the control signal is 1 μs at time $t_3$ and at time $t_4$, and the desired output voltages at time $t_3$ and time $t_4$ are 0.72V and 1.2V, respectively. The duty cycle of the control signal is therefore 0.72/12=6% at time $t_3$ and 1.2/12=10% at time $t_4$. Accordingly, the width of the control signal pulse at time $t_3$ is 0.06 μs and increases to 0.1 μs at time $t_4$.

Figure 6:
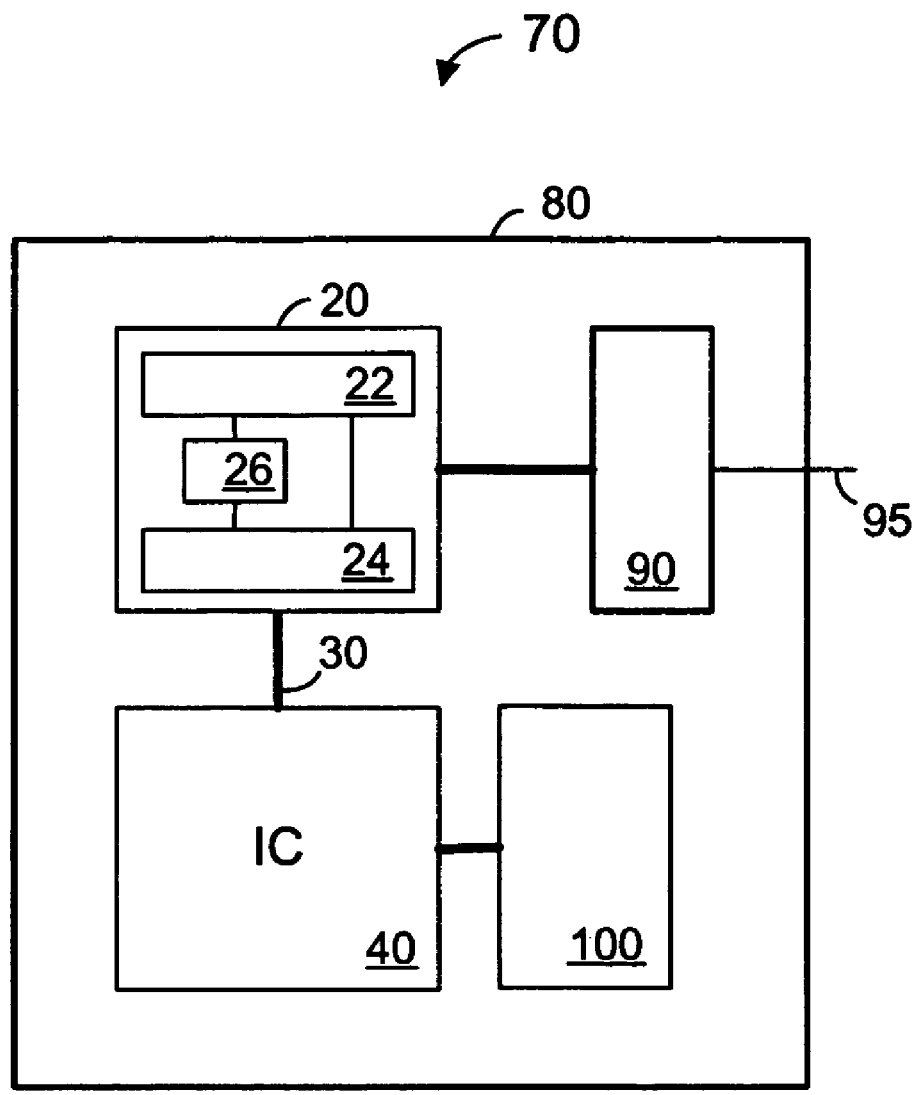
FIG. 6 is a block diagram of a system according to some embodiments.

FIG. 6 illustrates a system according to some embodiments. System 70 may execute process 60. System 70 includes voltage regulator 20, IC 40, motherboard 80, power supply 90, and memory 100. System 70 may comprise components of a desktop computing platform, and memory 100 may comprise any type of memory for storing data, such as a Single Data Rate Random Access Memory, a Double Data Rate Random Access Memory, or a Programmable Read Only Memory.

Voltage regulator 20 receives DC power from power supply 90 (which in turn receives AC power from power cord 95) and regulates the DC power to provide power to IC 40. Motherboard 80 therefore includes signal lines of power bus 30. Similarly, motherboard 80 may route I/O signals between IC 40 and memory 100.

The several embodiments described herein are solely for the purpose of illustration. Some embodiments may include any currently or hereafter-known versions of the elements described herein. Therefore, persons in the art will recognize from this description that other embodiments may be practiced with various modifications and alterations.

What is claimed is:

1. A method comprising:
   providing a control signal to a voltage converter to change a value of a voltage output by the voltage converter;

comparing the value of the voltage output to a predetermined voltage value via a comparator coupled to the voltage converter;

determining that a threshold associated with a pulse width of the control signal has been satisfied; and increasing a frequency of the control signal in response to determining that the threshold has been satisfied by changing an electrical value on which the frequency of the control signal is based in a case that the value of the voltage output is greater than the predetermined voltage value via a frequency-changing element coupled to the comparator and to the voltage controller.

2. A method according to claim 1, wherein the threshold is a predetermined value of the output voltage.

3. A method according to claim 2, wherein the predetermined value is a predetermined percentage of a target output voltage value.

4. A method according to claim 3, further comprising:

providing the control signal having the increased frequency to the voltage converter to generate the target output voltage value.

5. A method according to claim 1, wherein the threshold is an amount of time during which the control signal has been provided to increase the value of the output voltage.

6. A method according to claim 1, wherein increasing the frequency comprises:

changing an RC value on which the frequency is based.

7. A method according to claim 1, wherein increasing the frequency comprises:

gradually increasing the frequency.

8. A method according to claim 7, wherein the frequency is increased at start-up.

9. A method according to claim 1, wherein increasing the frequency comprises:

increasing the frequency stepwise.

10. An apparatus comprising:

a voltage controller to provide a control signal;

a voltage converter to receive the control signal and to change a value of an output voltage in response to the control signal; and an evaluation circuit to determine that a threshold associated with a pulse width of the control signal has been satisfied and to change an electrical value on which a frequency of the control signal is based if the threshold has been satisfied, wherein the voltage controller increases the frequency in response to the changed electrical value, and wherein the evaluation circuit comprises:

a comparator coupled to the voltage converter, the comparator to compare the value of the output voltage to a predetermined voltage value; and a frequency-changing element coupled to the comparator and to the voltage controller, the frequency-changing element to change the electrical value in a case that the value of the output voltage is greater than the predetermined voltage value.

11. An apparatus according to claim 10, wherein the frequency-changing element comprises a resistor.

12. A system comprising:

a microprocessor;

a double data rate memory coupled to the microprocessor; and a voltage regulator to provide an output voltage to the microprocessor, the voltage regulator comprising:

a voltage controller to provide a control signal;

a voltage converter to receive the control signal and to change a value of the output voltage in response to the control signal; and an evaluation circuit to determine that a threshold associated with a pulse width of the control signal has been satisfied and to change an electrical value on which a frequency of the control signal is based if the threshold has been satisfied, wherein the voltage controller increases the frequency in response to the changed electrical value, and the evaluation circuit comprises:

a comparator coupled to the voltage converter, the comparator to compare the value of the output voltage to a predetermined voltage value; and a frequency-changing element coupled to the comparator and to the voltage controller, the frequency-changing element to change the electrical value in a case that the value of the output voltage is greater than the predetermined voltage value.

13. A system according to claim 12, wherein the frequency-changing element comprises a resistor.

* * * * *